United States Patent [19]

Spada et al.

[11] Patent Number: 5,053,452
[45] Date of Patent: Oct. 1, 1991

[54] PRESSURE SENSITIVE ADHESIVES AND MANUFACTURED ARTICLES

[75] Inventors: Lon T. Spada, Walnut; Joseph J. Wilczynski, Yorba Linda, both of Calif.

[73] Assignee: Union Oil Company of California, Los Angeles, Calif.

[21] Appl. No.: 433,693

[22] Filed: Nov. 8, 1989

Related U.S. Application Data

[63] Continuation-in-part of Ser. No. 869,044, May 3, 1986, Pat. No. 4,759,983, and a continuation-in-part of Ser. No. 859,057, May 2, 1986, abandoned.

[51] Int. Cl.$^5$ .................... C08K 5/53; C08K 5/17; C08K 5/09
[52] U.S. Cl. .................... 524/707; 524/724; 524/777; 524/812; 524/817; 524/818; 524/831; 526/298; 526/312; 526/315; 526/316; 526/931
[58] Field of Search ............ 524/707; 724, 777, 818, 524/812, 817, 831, 239, 123, 124; 526/931

[56] References Cited

U.S. PATENT DOCUMENTS

| | | | |
|---|---|---|---|
| 3,345,336 | 10/1967 | Kuhlkamp et al. | 525/328.6 |
| 3,459,790 | 8/1969 | Smith | 560/178 |
| 3,488,708 | 1/1970 | Smith | 430/336 |
| 3,554,987 | 1/1971 | Smith | 430/627 |
| 3,607,834 | 9/1971 | Marx et al. | 524/357 |
| 3,658,878 | 4/1972 | Smith | 430/627 |
| 4,250,070 | 2/1981 | Ley et al. | 524/555 |
| 4,371,659 | 2/1983 | Druschke et al. | |
| 4,408,018 | 10/1983 | Bartman | 525/300 |
| 4,414,275 | 11/1983 | Woods | 428/352 |
| 4,421,889 | 12/1983 | Braun et al. | 524/381 |
| 4,540,739 | 9/1985 | Midgley | 524/764 |

FOREIGN PATENT DOCUMENTS

| | | | |
|---|---|---|---|
| 6707437 | 11/1967 | Netherlands . | |
| 1144486 | 3/1969 | United Kingdom | 525/300 |
| 1185216 | 3/1970 | United Kingdom . | |
| 1541909 | 3/1979 | United Kingdom | 106/288 Q |

OTHER PUBLICATIONS

D. A. Upson, "Journal of Polymer Science: Polymer Symposium" John Wiley and Sons, Inc., 1985, 72, (pp. 45–54).
Derwent Abstract 85-056921/10 (of German Patent DE 3329-622), 1985, Derwent Publications Ltd. (2 pages).
"WPIL" Computer-Printed Abstract of BE-699147-A, GB 1185216-A (Document AN Supra), DE 1644985-B, NL 6707437-A and FR 1526440 (One Page).

*Primary Examiner*—Christopher Henderson
*Attorney, Agent, or Firm*—Gregory F. Wirzbicki; Shlomo R. Frieman; Richard G. Jackson

[57] ABSTRACT

There are disclosed normally tacky, pressure-sensitive adhesive compositions comprising one or more normally tacky polymers having a $T_g$ of about 0° C. or less and containing pendant functional groups attached to the backbone and having the formula:

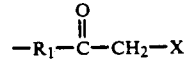

in which $R_1$ is a divalent organic radical at least 3 atoms in length, and X is organoacyl or cyano, the polymers preferably also being normally tacky when cured. Such polymers have markedly improved cohesive strength (shear holding value) with little or no detriment to adhesive tack or adhesion (peel resistance), and these improvements are realized without the necessity of incorporating cross-linking monomers such as N-methylolamides or other cross-linking agents. Pressure-sensitive adhesive, water-based emulsions containing such polymers and pressure-sensitive adhesive articles comprising a substrate having at least a portion of one surface thereof coated with the adhesive compositions are also disclosed. In a preferred embodiment, the adhesive compositions further include a polyacid component for further improving cohesive strength, particularly at acidic pH.

23 Claims, No Drawings

PRESSURE SENSITIVE ADHESIVES AND MANUFACTURED ARTICLES

This application is a division of U.S. application No. 07/178,499, filed Apr. 7, 1988, now U.S. Pat. No. 4,908,403 a continuation-in-part of U.S. patent applications Ser. No. 869,044 filed May 30, 1986, now U.S. Pat. No. 4,759,983 and Ser. No. 859,057 filed May 2, 1986 now abandoned.

BACKGROUND

1. Field of the Invention

This invention relates to the field of pressure-sensitive adhesives and to articles comprising such adhesives.

2. Introduction

Normally tacky, pressure-sensitive adhesives (PSAs) are used in the manufacture of a variety of articles such as adhesive tapes and other materials which are intended to be easily attachable to another substrate by the application of pressure alone. Many adhesives preferably have a balance of one or more properties such as tackiness at the temperature of use, adhesion (peel resistance), cohesion (shear resistance), elongation, elasticity, color clarity and color stability, and resistance to sunlight and other ultraviolet and degrading radiation sources. Maintaining the requisite balance of such properties while improving one or more characteristics of such pressure-sensitive adhesives is both difficult and unpredictable. Any modification of adhesive compositions which improves one adhesive property may detrimentally affect one or more other desirable properties. For instance, it is difficult to improve an adhesive's internal strength (cohesiveness and shear) without reducing one or more other desirable properties.

Interpolymers of olefinically unsaturated carboxylic acid ester monomers have received wide acceptance as pressure-sensitive adhesives due to the relatively good balance of properties they afford in many applications. However, many PSA applications require shear strength values higher than those that can be provided by the carboxylic acid ester polymers employed in many PSAs. Some applications require shear strength values of at least about 50 minutes and preferably higher, i.e. on the order of 500 to 10,000 minutes (determined by the shear value test described hereinafter). While there are various ways of improving PSA shear strength, many if not all of these detrimentally affect one or more other properties desirable in certain applications. For example, the molecular weight of carboxylic acid ester polymers can be increased to improve shear strength, but this route generally results in reduced tack and lower adhesion. Polar monomers, such as polymerizable carboxylic acids, can be added to the polymer to increase cohesive strength, but this procedure may result in low adhesion and tack. Crosslinking monomers, such as the N-methylol amides, or other crosslinking agents can be incorporated into the composition, but these procedures generally require expensive reagents and result in low tack and adhesion (peel resistance). Their use also may reduce processability and may impair other properties such as clarity, color stability and UV stability.

The suitability of pressure-sensitive adhesive compositions is also influenced to a large extent by the ease of manufacture of both the adhesive and of articles containing the adhesive and by environmental and personnel safety hazards. For instance, PSAs are typically applied to a backing as hot melts, polymer solutions or as dispersions of a polymer in an aqueous medium. Such solutions and dispersions must possess properties which facilitate their use in the manufacture of PSA-containing articles. Thus, the melt, solution or dispersion, as well as the polymer per se, must adequately wet the backing to assure adequate adhesive distribution, coverage and bonding to the backing.

The chemical composition of the PSA polymer carriers (when used) is also significant for several reasons. The use of solvents other than water is becoming more and more undesirable due to solvent expense and the cost and hazards involved in controlling solvent vapors. Yet such solvents are often necessary for adequate distribution and handling of polymers that cannot be employed effectively in water-based systems. Thus, water-based polymer latexes are much preferred in the adhesive manufacturing industry provided that the necessary physical and chemical properties of the finished article can be achieved. However, substantial loss of one or more physical properties often results from substitution of water-based latexes or hot melts for solvent-based polymer systems.

N-methylol amide functional groups and other crosslinking monomers or agents are known to improve physical performance in several respects. However, the resulting polymers release formaldehyde upon curing or can result in the presence of potentially toxic residues in the finished article. In particular, N-methylol amide-containing polymers release formaldehyde when cured, and they can result in formaldehyde residues in the finished product. Formaldehyde is coming under ever-increasing scrutiny in both the workplace and home and it is particularly undesirable in medical and personal contact applications, such as adhesive bandages. For example, the state and federal Occupational Health and Safety Administrations (OSHA) have set stringent formaldehyde exposure limits for industrial workers.

Various rheological properties of water-base latexes are particularly important with regard to the suitability of such latexes for adhesive article manufacture. Latex particle size and particle size distribution can significantly influence latex physical properties which affect application of the latex to a backing. Similarly, latex viscosity can limit latex utility in adhesive article manufacture due to the influence of viscosity on adhesive distribution, filler loading (of the latex) and wetting of the adhesive article backing.

Yet further demands are placed on the chemical composition and physical properties of low-temperature pressure-sensitive adhesives, i.e., adhesives intended for use at relatively low temperatures. Often, PSAs which have adequate cohesive and adhesive strength at low temperatures are so "gummy" at ambient conditions that they complicate both adhesive handling at ambient temperatures and the manufacture of adhesive-containing articles. Such gumminess also causes adhesive "creep" and "bleed-through" on labels and other backings.

Thus, it can be seen that the physical and chemical properties desired in adhesive compositions and articles, and in the polymer solutions, dispersions and melts employed in the manufacture of adhesive articles, place various, sometimes conflicting, demands on polymer composition and on the polymer carrier, i.e, solvent or water, if used.

Accordingly, it is desirable to obtain a polymer system, preferably a water-based or hot-melt system, which possesses a balance of properties suitable for the manufacture of pressure-sensitive adhesives and PSA-containing articles. It is further desirable to obtain such a polymer system having such properties under acidic conditions.

SUMMARY DESCRIPTION OF THE INVENTION

It has now been found that pressure-sensitive adhesives, and articles containing pressure-sensitive adhesives, having an improved balance of PSA properties and, in particular, having improved shear holding value and acceptable adhesive strength (peel resistance) and tack, can be obtained by employing, as a principal component of the adhesive, a polymer having a $T_g$ of about 0° C. or less and containing at least one pendant functional group (i.e., one or more pendant functional groups) of the formula:

$$-R_1-\overset{\overset{\displaystyle O}{\|}}{C}-CH_2-X \quad (1)$$

wherein $R_1$ is a divalent organic radical at least 3 atoms in length, and X is organoacyl or cyano. As used herein, the term "organic radical" means any radical containing at least one carbon atom.

Preferably, the polymer is normally tacky and pressure-sensitive and also normally tacky when cured, i.e., when set.

Functional groups within formula (1) wherein $R_1$ and X are different can be contained in the same polymer molecule, and polymers containing different $R_1$s and Xs can be blended in the same solution, dispersion or hot melt. The polymers can be manufactured and applied to backings as solutions, aqueous dispersions (latexes), hot melts or combinations of two or more of these forms. Aqueous dispersions and melts are preferred since they eliminate the costs and hazards associated with polymer solvents other than water. Such pressure-sensitive adhesives and adhesive articles have an improved balance of properties. In particular, they possess improved or increased cohesive strength without significant, if any, loss or decrease of adhesion or tack relative to PSAs which are identical except not containing pendant functional groups of formula (1) above.

It has also now been found that, particularly at acidic pH, the cohesive strength (shear holding value) of the pressure-sensitive adhesives and articles of this invention can be further improved by employing a polyacid or salt thereof as an additional component of the adhesive. Such component is hereinafter referred to as a polyacid component. Advantageously and unexpectedly, such further improvement evidences a cooperative, often synergistic, effect between the pendant functional groups and the polyacid component.

The PSAs of this invention are relatively clear, colorless materials (unless intentionally colored by the addition of colorants), and they possess adequate color stability and resistance to sunlight and other ultraviolet sources. The PSAs and adhesive articles of this invention do not require the use of crosslinking agents and catalysts, such as N-methylol amide monomers, although they may contain one or more of such materials. The low $T_g$ polymers useful as low-temperature pressure-sensitive adhesives (i.e., PSAs intended for use at low temperature, e.g., about 10° C. or less) have adequate cohesive and adhesive strength at low temperatures yet are not excessively or unacceptably gummy at ambient temperatures.

DETAILED DESCRIPTION OF THE INVENTION AND OF THE MANNER AND PROCESS OF MAKING AND USING IT

Normally tacky and pressure sensitive adhesive compositions are provided which comprise a polymer having a $T_g$ of about 0° C. or less and containing at least one pendant functional group (i.e., one or more pendant functional groups) of the formula:

$$-R_1-\overset{\overset{\displaystyle O}{\|}}{C}-CH_2-X \quad (1)$$

wherein $R_1$ is a divalent organic radical at least 3 atoms in length, and X is organoacyl or cyano.

Any polymer containing at least one pendant functional group of formula (1), supra, can be employed as the polymer in this invention. The remainder of the polymer, i.e., the polymer portion other than the one or more pendant functional groups of formula (1), may be, for example, selected from the polymeric entities described in the aforesaid U.S. patent application Ser. No. 859,057 filed May 2, 1986, and those described in the aforesaid U.S. patent application Ser. No. 869,044 filed May 30, 1986, the disclosures of both such applications being incorporated herein by reference in their entireties. Thus, the remainder of the polymer may be selected, for example, from (A) olefinically unsaturated carboxylic acid ester polymers comprising at least about 40 weight percent polymerized olefinically unsaturated carboxylic acid ester monomers, (B) olefin ester interpolymers comprising at least about 1 weight percent of a monoolefin monomer having up to about 4 carbon atoms and at least about 40 weight percent of an alkenyl or alkenol ester of a saturated carboxylic acid, (C) conjugated diolefin polymers comprising at least about 50 weight percent of one or more conjugated diene monomers having 4 to about 8 carbon atoms and 0 to about 50 weight percent of one or more alkenyl-substituted monoaromatic monomers, (D) alkenyl ether polymers containing at least about 30 weight percent alkenyl ether monomer units, and (E) combinations thereof. The polymers of group (A) are preferred, i.e., the remainder of the polymer containing at least one pendant functional group of formula (1) preferably comprises at least about 40 weight percent of at least one polymerized olefinically unsaturated carboxylic acid ester monomer, the polymer preferably being normally tacky, pressure sensitive and normally tacky when cured, i.e. when set. For simplicity, the balance of this description is given with principal reference to polymers containing at least one polymerized olefinically unsaturated carboxylic acid ester monomer, it being understood that, as indicated supra, other polymers containing at least one functional monomer of formula (1) can be employed as the polymer in this invention.

In general, the pressure-sensitive polymers and adhesive compositions of this invention cure (i.e., set) as a result of being subjected to pressure when, for example, they are in contact with a substrate. That is, in general, mere application of pressure results in forming a joint or bond between the substrate and the polymer or composition, with nothing more being required to complete the joint or bond. The pressure-sensitive polymer is described as "cured" or "set" when the joint or bond has been formed, notwithstanding that the bond strength (peel strength) may be found to increase with the passage of time, especially where the bond is heated. For a discussion of setting and curing of adhesives in general and of pressure-sensitive adhesives in particular, the reader is referred to Kirk-Othmer, Encyclopedia of Chemical Technology, 3rd edition, Vol. 1, John Wiley & Sons, New York, 1978, pages 488-510, particularly pages 501-502, the disclosure of which is incorporated herein by reference in its entirety.

Functional groups within formula (1), supra, containing different $R_1$ and X radicals can be contained in the same polymer molecule, and polymers containing different $R_1$ and X radicals can be blended in the same solution, dispersion or hot melt. It is essential only that the useful polymers (1) contain at least one polymerized olefinically unsaturated carboxylic acid ester monomer (i.e., the addition polymerized residue of such unsaturated monomer), (2) contain pendant functional groups comprising either two carbonyl groups or a carbonyl group and a cyano group separated by a single methylene group, as illustrated, and (3) the methylene group is separated from the polymer main chain (backbone) by at least 4 atoms ($R_1$ plus the "interior" carbonyl group). Thus, $R_1$ is at least 3 atoms in length; i.e., the shortest link between the interior carbonyl group and the polymer backbone is at least 3 atoms long. Otherwise, the structure of $R_1$, including its molecular weight and elemental composition, does not negate the effectiveness of the dual keto or keto-cyano functionality of the pendant side chains. Thus, $R_1$ can be a divalent organic radical of any molecular weight effective to allow incorporation of the pendant functional groups into the polymer, i.e. attachment of the pendant functional groups to the polymer backbone; for instance (a) as part of a polymerizable olefinically unsaturated monomer by way of copolymerization thereof or (b) by substitution onto a preferred polymer, i.e. by substitution onto a preferred polymer backbone ("Backbone") by any suitable reaction, e.g.:

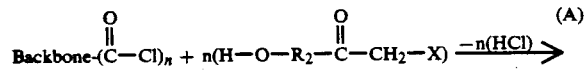

(A)

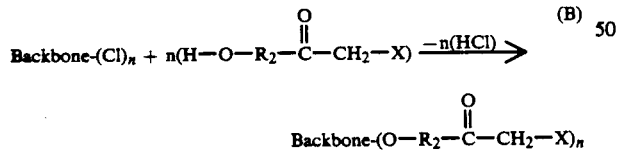

or

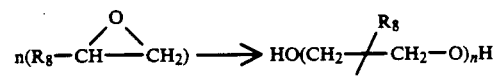

(B)

$$\text{Backbone-(O-R}_2\text{-}\overset{\overset{\displaystyle O}{\|}}{C}\text{-CH}_2\text{-X)}_n$$

In reactions (A) and (B), supra, n is an integer, and O—$R_2$ is $R_1$ in formula (1), supra, $R_2$ being a divalent organic radical, usually of not more than 100 atoms in length, and preferably containing no more than 39 carbon atoms (more preferably, no more than 19 carbon atoms). $R_1$ can contain heteroatoms, such as oxygen, sulfur, phosphorus, and nitrogen; functional groups such as carbonyl, carboxy-ester, thio, and amino substituents; and can comprise aromatic, olefinic or alkynyl unsaturation. Typically, $R_1$ will be a cyclic or acyclic divalent organic radical of 3 to about 40 atoms in length, i.e., having 3 to about 40 atoms in its shortest chain between the polymer backbone and the interior carbonyl group. For ease of manufacture from readily available reactants, $R_1$ is preferably of the formula:

(2)

wherein Y and Z are independently selected from O, S, and $NR_7$, and $R_3$ is a divalent organic radical at least 1 atom in length, preferably 2 to about 40, and most preferably 2 to about 20 atoms in length. Y and Z are preferably O, and $R_7$ is H or a monovalent organic radical, preferably H or a hydrocarbyl radical (preferably an alkyl group) having up to 6 carbon atoms, with $R_7$ most preferably being H. Most preferably, $R_3$ is selected from substituted and unsubstituted alkylene, polyoxyalkylene, polythiolkylene and polyaminoalkylene radicals, typically up to about 40 atoms in length, preferably up to about 20 atoms in length. The substituted and unsubstituted polythio-, polyoxy-, and polyaminoalkylenes can be readily formed by the well known condensation of alkylene oxides, alkylene amines, glycols, diamines, and dithiols. Thus, for example:

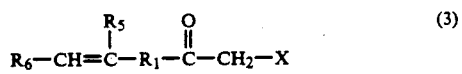

where $R_8$ is H or a monovalent organic radical, preferably H or an alkyl radical, and, as will be readily apparent to those skilled in the art, the illustrated general formula for the product represents HO(CH[$R_8$]—CH$_2$—O)$_n$H, HO(CH$_2$—CH[$R_8$(—O)$_n$H and mixtures thereof. Such $R_8$ radicals typically contain no more than about 38 carbon atoms and, more typically, no more than about 18 carbon atoms.

X in expression (1) is preferably —C—$R_4$ or —CN, more preferably —CO—$R_4$ where $R_4$ is hydrogen or a monovalent organic radical preferably having up to 10 atoms other than hydrogen (i.e., up to 10 atoms not counting hydrogen atoms which may be present in the radical), $R_4$ most preferably being methyl.

To illustrate, the pendant functional groups of formula (1) can be introduced into the polymer backbone, i.e. included in the polymer, by copolymerization of other monomers (discussed hereinafter) with a polymerizable functional monomer of the formula:

$$R_6-CH=\overset{\overset{\displaystyle R_5}{|}}{C}-R_1-\overset{\overset{\displaystyle O}{\|}}{C}-CH_2-X \qquad (3)$$

wherein X and $R_1$ are as defined for formula 1, supra, $R_5$ and $R_6$ are independently selected from hydrogen, hydroxy, halo, thio, amino, and monovalent organic radicals, preferably having up to 10 atoms other than hydrogen, most preferably alkyl radicals having up to 10 carbons atoms. Substituting the preferred form of the group $R_1$ illustrated in formula 2 for $R_1$ in formula 1 yields the most preferred functional monomers:

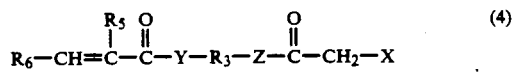

(4)

where $R_3$, $R_5$, $R_6$, X, Y and Z have the definitions given above. From this expression it can be seen that when $R_6$ is hydrogen, X is —CO—R$_4$, R$_4$ and R$_5$ are methyl, Y and Z are O, and R$_3$ is an ethylene radical, the resulting monomer is acetoacetoxyethyl methacrylate, one of the class of monomers described by Smith in U.S. Pat. No. 3,554,987, the disclosure of which is incorporated herein by reference in its entirety. This monomer can be prepared by first treating ethylene glycol with methacrylic acid to form hydroxyethyl methacrylate which then is treated with diketene, as described by Smith, to form acetoacetoxyethyl methacrylate. A particularly preferred class of functional monomers, due to their relative availability, are those disclosed by Smith, which correspond to formula (4) in which R$_6$ is hydrogen, Y and Z are oxygen, R$_5$ is hydrogen or an alkyl group having up to 12 carbon atoms, R$_3$ is an alkylene group containing up to 10 carbon atoms, X is —CO—R$_4$, and R$_4$ is an alkyl group having up to 8 carbon atoms. Another functional monomer of formula 4 is acetoacetoxyethyl acrylate.

The normally tacky, pressure-sensitive adhesive polymers of this invention contain a sufficient amount of one or more of the described functional monomers to increase cohesive strength of the adhesive relative to an otherwise identical pressure sensitive adhesive in the absence of such functional monomers. Detectable enhancement of cohesive strength is found in many polymers at functional monomer concentrations as low as 0.05 weight percent. Generally, however, the useful polymers will contain at least about 0.1 and typically at least about 0.25 weight percent of the functional monomer based on total polymer weight. Much higher functional monomer concentrations can be employed. Thus, functional monomer concentrations will usually be between about 0.1 to about 20 weight percent or, more typically, about 0.25 to about 10 weight percent. Surprisingly, very significant increases in cohesive strength can be achieved at functional monomer concentrations below 5 weight percent and even below 2 weight percent Hence, preferred functional monomer concentrations in many of the useful pressure-sensitive adhesives will be within the range of about 0.1 to about 5 weight percent, often within the range of about 0.1 to about 2 weight percent.

The remainder of the polymer comprises, primarily, one or more of a variety of polymerized olefinically unsaturated mono- and/or polycarboxylic acid esters, and optionally it may contain other polymerized olefinically unsaturated monomers as described more fully hereinafter. Thus, the polymers usually contain at least about 40 weight percent, often at least about 60 weight percent, and preferably at least about 80 weight percent polymerized olefinically unsaturated carboxylic acid ester monomers. Presently preferred ester monomers are esters of olefinically unsaturated mono- or polycarboxylic acids having 4-17 carbon atoms and hydroxy-, amino-, or thio-substituted or unsubstituted alcohols, amines, and thiols having from 1 to about 30 carbon atoms, preferably 1 to about 20 carbon atoms, per molecule. Illustrative unsaturated carboxylic acids are acrylic, methacrylic, fumaric, maleic and itaconic acids, etc. Illustrative hydroxy-, amino-, and thio-substituted alcohols, amines, and thiols are glycerol, 1-hydroxy-5-thiododecane and 2-amino-5-hydroxyhexane, etc. Presently preferred esters, due primarily to cost and availability, are hydroxy-substituted and unsubstituted alcohol esters of acrylic and methacrylic acids such as butyl acrylate ("BA"), 2-ethylhexyl acrylate ("EHA"), methyl methacrylate ("MMA") and hydroxyethyl acrylate ("HEA"), etc.

A wide variety of olefinically unsaturated carboxylic acid ester monomers, as well as a variety of other polymerizable olefinically unsaturated monomers useful for the manufacture of pressure-sensitive adhesive polymers, and the interrelationship of these monomers to polymer T$_g$ (glass transition temperature) are discussed at length by Donatas Satas in the Handbook of Pressure-Sensitive Adhesive Technology, Van Nostrand-Reinhold Company, New York, 1982, particularly at pages 298 through 329, including the bibliography thereto, the disclosure of which is incorporated herein by reference in its entirety. As discussed by Satas, the principal characteristic of pressure-sensitive adhesives based on such carboxylic acid ester homo- or interpolymers is the low glass transition temperature (T$_g$) which can be achieved, in some instances, with carboxylic acid ester homopolymers, but is primarily obtained by polymerizing "hard" ester monomers with suitable proportions of "soft" ester monomers to obtain a polymer having the T$_g$ best suited to the particular application. So-called "hard" monomers are those which produce homopolymers having relatively high T$_g$s, while "soft" monomers are those which form homopolymers having relatively low T$_g$s. For instance, acrylate ester monomers are typically "softer" than the corresponding methacrylic acid esters. Thus, poly(ethyl acrylate) has a T$_g$ of $-22°$ C. while poly(ethyl methacrylate) has a T$_g$ of 65° C. The T$_g$ of poly(n-butyl acrylate) is $-54°$ C. as compared to a T$_g$ of 20° C. for poly(n-butyl methacrylate). Commonly employed "soft" monomers are n-butyl acrylate, 2-ethylhexyl acrylate and n-octyl acrylate, while various methacrylates, including methyl, isopropyl, n-butyl, and t-butyl methacrylate, are typical "hard" monomers. The T$_g$ of any homopolymer can be readily determined, and the T$_g$ of an interpolymer of two or more such monomers can be predicted, roughly, from the respective T$_g$s of each of the monomers involved. The most exact method of determining the glass transition temperature of a selected interpolymer of any combination of monomers is, of course, measurement of the T$_g$ of that interpolymer per se. The homo- and interpolymers useful in the pressure-sensitive adhesives of this invention typically have T$_g$s of about 0° C. or less, preferably about $-10°$ C. or less. Polymers having lower T$_g$s are particularly preferred for use as low temperature pressure-sensitive adhesives which generally have T$_g$s on the order of about $-40°$ C. or less. Thus, the useful polymers will generally have T$_g$s within the range of about $-80°$ to about 0° C., preferably about $-60°$ to about $-10°$ C.

The described functional monomers and olefinically unsaturated carboxylic acid ester monomers can constitute, when polymerized, the total polymer composition, or a portion of the polymer molecule not accounted for by those two monomer classes can be, when polymerized, any polymerizable, olefinically unsaturated monomer or combination of such monomers. Illustrative of other polymerizable monomers are vinyl esters of carboxylic acids, the acid moiety of which contains from 1 to about 20 carbon atoms (e.g., vinyl acetate, vinyl propionate, vinyl isononanoate); aromatic or aliphatic, alpha-beta-unsaturated hydrocarbons such as ethylene, propylene, styrene, and vinyl toluene; vinyl halides such as vinyl chloride and vinylidene chloride; olefinically unsaturated nitriles such as acrylonitrile; and olefinically unsaturated carboxylic acids having 3 to 10 carbon atoms such as acrylic, methacrylic, crotonic, itaconic, and fumaric acids, and the like.

It has been found that minor amounts of olefinically unsaturated carboxylic acids and/or sulfoalkyl esters of such carboxylic acids significantly improve cohesive strength of the PSA polymer It is presently preferred that the polymer contain at least about 0.1 weight percent, usually about 0.1 to about 10 weight percent, and preferably about 0.1 to about 5 weight percent of a polymerized, olefinically unsaturated carboxylic acid having up to about 10 carbon atoms and/or a sulfoalkyl ester of such acid, e.g., sulfoethyl methacrylate, sulfoethyl itaconate, sulfomethyl malonate, etc.

Although the polymers of this invention can contain other functional monomers such as N-methylol amides, e.g., N-methylol acrylamide, it has been found that such other functional monomers are not essential to achieving acceptable adhesive properties and that the detriment associated with the presence of such monomers, such as formaldehyde release upon curing and loss of tack and adhesion, etc., can be avoided by minimizing the concentration of such N-methylol amides or eliminating them altogether. Thus, the preferred polymers contain less than about 1 percent, preferably less than about 0.5 percent, and most preferably no amount of N-methylol amide monomer units.

It also has been found that suitable adhesive properties can be achieved without crosslinking or hardening agents such as aldehyde hardeners (e.g., formaldehyde, mucochloric acid, etc.), crosslinking catalysts such as the strong base catalysts discussed by Bartman in U.S. Pat. No. 4,408,018, acid catalysts such as phosphoric or methane sulfonic acid, complexing agents such as metals and metal compounds and complexes, or reactive monomers (e.g., glycols, polyamides, etc.). Since such hardening agents are not required to obtain the necessary pressure sensitive properties with the polymers of this invention, and, in many instances, the incorporation of such "hardening" agents results in the degradation of other desirable PSA properties such as tack and adhesion, the preferred polymers are substantially free of such hardening agents and their residues. Nevertheless, minor amounts of such materials can be present in the polymers, solutions, dispersions and adhesive articles of this invention.

In embodiments employing a polyacid component (i.e., a polyacid, a salt thereof, a mixture of polyacids or a mixture of such salts) as a component of the pressure-sensitive adhesive compositions of this invention, any polyacid or salt thereof can be effectively employed as the polyacid component. The polyacid may be, for example, a polyphosphonic acid, a polycarboxylic acid (preferred), or a mixture of such organic polyacids. The polyacid is preferably free of carbon-to-carbon unsaturation, especially unsaturated aliphatic carbon-to-carbon bonds. As used herein, the term "polyacid" includes diacids as well as tri-, tetra- and higher acids. The polyacid component typically comprises at least one aminopolycarboxylic acid or salt thereof or at least one polyphosphonic acid (e.g., an aminopolyphosphonic acid) or salt thereof.

Suitable aminopolycarboxylic acids for the practice of this invention include, for example, ethylenediaminetetraacetic acid ("EDTA"), N-hydroxyethylethylenediaminetriacetic acid ("HEDTA"), nitrilotriacetic acid ("NTA"), iminodiacetic acid ("IDA"), methyliminodiacetic acid ("MIDA"), diethylenetriaminepentaacetic acid ("DETPA"), 1,2-diaminocyclohexanetetraacetic acid ("DACHTA"), ethylenebis(hydroxyphenylglycine) ("EHPG"), which are commercially available, and mixtures thereof.

Suitable polyphosphonic acids for the practice of this invention include, for example, aminopolyphosphonic acids, e.g. nitrilotrimethylenephosphonic acid ("NTPO" or "ATMP") and ethylenediaminetetramethylenephosphonic acid ("EDTPO"); hydroxypolyphosphonic acids, e.g., N-hydroxyethylidenediphosphonic acid ("HEDP"), all of which are commercially available; and mixtures thereof.

Suitable salts of the foregoing polyacids include, for example, the mono- and poly-alkali metal and ammonium salts thereof, such as the monosodium, disodium, trisodium and tetrasodium salts of EDTA and the corresponding salts of EDTPO.

Preferably, the polyacid component comprises at least one aminopolycarboxylic acid or salt thereof and, more preferably, ethylenediaminetetraacetic acid or a salt thereof. Still more preferably, the polyacid component comprises a sodium salt of ethylenediaminetetraacetic acid, i.e., the monosodium salt, the disodium salt, the trisodium salt or, most preferably, the tetrasodium salt thereof ("Na$_4$EDTA").

The polyacid component may be employed in any amount effective for increasing the cohesive strength (typically measured by the shear holding value described herein) of the pressure-sensitive adhesive composition under acidic conditions relative to an otherwise identical pressure-sensitive adhesive in the absence of such component. Advantageously and unexpectedly, the further improvement provided by additionally including a polyacid component in the adhesives of this invention evidences a cooperative, often synergistic, effect between the pendant functional groups and the polyacid component. Detectable enhancement of cohesive strength is found in many adhesive compositions of this invention at concentrations of polyacid component as low as 0.05 weight percent, based on the total weight of the polymer. Generally, however, the polymer will contain at least about 0.1 and typically at least about 0.5 weight percent of the polyacid component based on total polymer weight. Much higher concentrations of polyacid component can be employed. Thus, concentrations of polyacid component will usually be from about 0.1 to about 20 weight percent or, more typically, about 0.5 to about 10 weight percent. Surprisingly, very significant increases in cohesive strength can be achieved at concentrations of polyacid component below 5 weight percent and even below 2 weight percent. Hence, preferred concentrations of polyacid component in many of the pressure-sensitive adhesives of this invention are from about 0.5 to about 5 weight percent and, more preferably, from about 0.5 to about 2 weight percent, based on the total weight of the polymer.

The improvements in cohesive strength in embodiments of this invention wherein a polyacid component is employed are obtainable particularly under acidic conditions (i.e., conditions of any pH below pH 7), including, for example, a pH of about 6.5 or less and even about pH 6 or less. Accordingly, this invention provides adhesive compositions as described supra and further having an acidic pH, e.g. of about pH 6.5 or less, the polyacid component being present in an amount effective for increasing cohesive strength at such pH and even as low as about pH 6 or less, with the polyacid component being present in a correspondingly effective amount.

In a preferred embodiment, the adhesive composition of this invention has a pH of about 6 or less, the polyacid component is the tetrasodium salt of ethylenediaminetetraacetic acid and such salt is present in an amount from about 0.5 to about 5 weight percent based on the weight of the polymer.

Advantageously and most preferably, the ester monomer is selected from the group consisting of acrylic and methacrylic acid esters having 4 to about 14 carbon atoms and combinations thereof; the functional monomer is selected from the group consisting of acetoacetoxyethyl methacrylate, acetoacetoxyethyl acrylate and combinations thereof and is present in an amount from about 0.1 to about 10 weight percent based on the weight of the polymer; and the polyacid component is the tetrasodium salt of ethylenediaminetetraacetic acid and is present in an amount from about 0.5 to about 5 weight percent based on the weight of the polymer.

Polymer molecular weight can have a significant effect on the balance of pressure sensitive adhesive properties in polymers of a given monomer composition, i.e. polymers of identical monomer content.

Thus, as discussed in Satas, Handbook of Pressure Sensitive Adhesive Technology, supra, particularly at pages 307-311, shear resistance is roughly proportional to molecular weight up to relatively high molecular weights at which shear resistance drops off dramatically in some polymers. Tack is typically high at very low molecular weights and decreases gradually as molecular weight is increased after a molecular weight value yielding optimum tack is exceeded. Adhesion typically exhibits discontinuous behavior, increasing with molecular weight up to moderate molecular weight levels and then gradually decreasing as molecular weight is increased further. The polymers useful in the adhesives of this invention typically have number average molecular weights of at least about 10,000, generally within the range of about 10,000 to about 1,000,000 as determined by gel permeation chromatography. Such polymers have relatively high shear values (cohesive strength) and a favorable balance of other properties including peel value (adhesion) and tack. Thus, the adhesives typically have shear holding values of at least about 20 minutes, typically at least about 50 minutes, and, in high shear formulations, as much as 1,000 minutes or more measured at 75° F. under 500 gram loading as described hereinafter. Peel values are generally at least about 1.5, most often at least about 1.8, and preferably at least about 2 pounds per inch width. Yet the high shear and peel values of these pressure-sensitive adhesives are not achieved at the expense of significant, if any, diminution of tack. The polymers generally have loop tack values of at least about 0.8 pound per half inch width, i.e. they exhibit tack approximately equivalent to, and sometimes even higher than, the loop tack exhibited by otherwise identical polymers not containing the described pendant functional groups. For the purposes of this disclosure, properties such as shear strength, peel adhesion, and loop tack are determined as described hereinafter in connection with the illustrative examples unless otherwise specified.

While the pressure-sensitive adhesives of this invention usually exhibit sufficient tack for most applications without additional tackifiers, such tackifiers may be employed in any tackifying amounts, including minor and major amounts. The adhesives may contain very minor amounts of tackifiers to increase tack of the total composition only slightly, or they may contain up to 150 weight parts or more of tackifier per 100 weight parts of one or more of the described polymers. Suitable tackifiers include rosins, hydrogenated rosins, esters of such rosins, synthetic hydrocarbon tackifiers and low molecular weight and low $T_g$ polycarboxylic acid esters. Typical rosins and hydrogenated rosin ester tackifiers have ring and ball softening temperatures of about 25° C. to about 115° C., while preferred tackifiers have softening temperatures of about 50° C. to about 110° C. Useful hydrocarbon tackifiers may be manufactured from $C_9$ aromatic monomers or from $C_5$ aliphatic monomers and mixtures of such aromatic and aliphatic monomers. Such monomers are usually derived from the so called $C_9$ and $C_5$ cuts in the fractionation of crude oil or similar material. Such synthetic hydrocarbon tackifiers generally have ring and ball softening temperatures of about 10° C. to about 100° C. The polycarboxylic acid ester tackifier resins are polymerized from one or more monomers such as acrylic acid which is substituted or unsubstituted with alkyl or alkoxy radicals having one to four carbon atoms or with alkyl or alkanol esters of such acids in which the alkyl or alkanol moiety has from one to about six carbon atoms. However, since the useful adhesive compositions can be formulated to provide adequate tack for most situations in the absence of tackifiers, it is presently preferred that the compositions be substantially free of such tackifiers.

Aqueous dispersions and solvent-containing solutions of the useful polymers can be prepared by procedures known in the art to be suitable for the preparation of olefinically unsaturated carboxylic acid ester polymers, such as acrylic ester polymers. For example, aqueous polymer dispersions can be prepared by gradually adding each monomer to be polymerized simultaneously to an aqueous reaction medium at rates proportionate to the respective percentage of each monomer in the finished polymer and initiating and continuing polymerization with a suitable polymerization catalyst. Illustrative catalysts are free radical initiators and redox systems such as hydrogen peroxide, potassium or ammonium peroxydisulfate, dibenzoyl peroxide, lauroyl peroxide, ditertiarybutyl peroxide, 2,2'-azobisisobutyronitrile, etc., either alone or together with one or more reducing components such as sodium bisulfite, sodium metabisulfite, glucose, ascorbic acid, erythorbic acid, etc. Ultraviolet (UV) and electron beam polymerization methods suitable for initiating free radical polymerization are discussed in the Handbook of Pressure-Sensitive Adhesive Technology, particularly at pages 586-604 and the references cited therein. The reaction is continued with agitation at a temperature sufficient to maintain an adequate reaction rate until most or all added monomers are consumed. Monomer addition is usually continued until the latex (dispersion) reaches a polymer concentration of about 10 to about 60 weight percent.

Physical stability of the dispersion usually is achieved by providing in the aqueous reaction medium one or more surfactants (emulsifiers) such as nonionic, anionic, and/or amphoteric surfactants. Illustrative of nonionic surfactants are alkylpolyglycol ethers such as ethoxylation products of lauryl, oleyl, and stearyl alcohols or mixtures of such alcohols, such as coconut fatty alcohols; alkylphenol polyglycol ethers such as ethoxylation products of octyl- and nonylphenol, diisopropylphenol, triisopropylphenol and di-and tritertiarybutyl phenol, etc. Illustrative of anionic surfactants are alkali metal and ammonium salts of alkyl, aryl, and alkylaryl sulfonates, sulfates, phosphates, and phosphonates, etc. Examples include sodium lauryl sulfate, sodium octylphenol glycolether sulfate, sodium dodecylbenzene sulfonate, sodium lauryldiglycol sulfate, and ammonium tritertiarybutylphenol penta- and octa-glycol sulfates. Numerous other examples of suitable ionic, nonionic and amphoteric surfactants are disclosed in U.S. Pat. Nos. 2,600,831, 2,271,622, 2,271,623, 2,275,727, 2,787,604, 2,816,920, and 2,739,891, the disclosures of which are incorporated herein by reference in their entireties.

Protective colloids may be added to the aqueous polymer dispersions either during or after the reaction period. Illustrative protective colloids include gum arabic, starch, alginates, and modified natural substances such as methyl-, ethyl-, hydroxyalkyl-, and carboxymethylcellulose, and synthetic substances such as polyvinyl alcohol, polyvinyl pyrrolidone, and mixtures of two or more of such substances. Fillers and/or extenders such as dispersible clays and colorants, such as pigments and dyes, can also be added to the aqueous dispersions either during or after polymerization. Those skilled in the art of emulsion polymers will appreciate that protective colloids, tackifiers, and other additives should be compatible with the polymer emulsion to assure formation of a stable dispersion.

The emulsions typically contain about 40 to about 70 percent polymer as manufactured, while preferred latexes typically have solids contents of about 40 to about 60 weight percent polymer solids. The dispersed polymer particles can be of any size suitable for the intended use, although particle sizes of at least about 120 nanometers are presently preferred. Most often, the described latexes will have polymer particle sizes within the range of about 120 to about 1000 nanometers as determined on the model N-4 "Nanosizer" available from Coulter Electronics, Inc., of Hialeah, Fla. Accordingly, the polymer content of both the aqueous dispersions and solutions can be increased, or the loading of the dispersions and solutions with fillers such as clays, pigments, and other extenders can be increased, without exceeding permissible viscosity limits. For example, aqueous dispersions and polymer solutions can contain more than 2 percent, often more than 5 percent, and even more than 10 percent fillers, colorants, and/or extenders.

Solutions of the useful polymers can be prepared by polymerizing the selected monomers as described above in solvents in which both the monomers and the polymers are soluble. Suitable solvents include aromatic solvents such as xylene and toluene, and alcohols such as butanol. Polymerization initiators and reducing components, when employed, should be soluble in the selected solvent or mixture of solvents. Illustrative polymerization initiators soluble in the noted organic solvents include dibenzoyl peroxide, lauroyl peroxide, and 2,2'-azobisisobutyronitrile. Erythorbic and ascorbic acids are illustrative of reducing components soluble in polar organic solvents.

The adhesive compositions of embodiments of this invention wherein a polyacid component is included can be prepared by well-known compositing procedures for compositing carboxylic acid ester polymers, such as acrylic ester polymers, with other ingredients. For example, the polyacid component can be added with stirring to an aqueous dispersion or solvent-based solution of the polymer component, with stirring preferably continued until the polyacid component is dispersed essentially throughout the dispersion or solution employed. The polyacid component can similarly be added with stirring to such polymer component in the melt using melt mixing procedures well known in the art. Alternatively, the polymer component can be prepared by polymerization in the presence of the polyacid component. Combinations of such procedures can be employed if desired. As a general preference, the polyacid component is added to a dispersion or solution of the polymer component.

The pressure-sensitive adhesives of this invention can be applied to any backing which it is desired to adhere to another surface or article. Illustrative backings include flexible and rigid (solid), natural and synthetic materials such as plastics, elastomers, solid metals and foils, ceramics (tiles, glass, etc.), wood, papers and cardboard, leather materials, etc. of essentially any form including films, solid articles, woven and non-woven textile materials, etc. Illustrative uses of such articles include wall coverings (paper, fabric, films, etc.), upholstery items, construction roofing and siding materials, tapes of all varieties (including those having backings comprised of woven or non-woven fabrics, paper, polymeric films, metal foils, foams, etc., including double-faced tapes and so-called transfer tapes), packaging, floor and wall tile, other floor and wall coverings, and paneling, etc.

Suitable backing and substrate materials can be of essentially any chemical composition and include, for example, metals, ceramics (including glass), and natural and synthetic polar and non-polar materials such as polyolefins, e.g., homopolymers and interpolymers of substituted and nonsubstituted olefinically unsaturated hydrocarbons including ethylene, propylene, styrene, butadiene, dicyclopentadiene, etc., and materials which typically contain polar functional groups such as hydroxy, etheral, carbonyl, carboxylic acid (including carboxylic acid salts), carboxylic acid esters (including thio esters), amides, amines, etc. Essentially all natural materials include one or more polar functional groups. Illustrative are virgin and reclaimed cellulosic fibers such as cotton, paper, wood, coconut fiber, jute, hemp, etc., and proteinaceous materials such as leather, wool, and other animal fur. Illustrative synthetic materials containing polar functional groups are polyesters, polyamides, carboxylated styrene-butadiene polymers, etc., such as Nylon-6, Nylon-66, Nylon-610, "Dacron", "Fortrel", "Kodel", "Acrilan", "Orlon", "Creslan", "Verel" and "Dynel". Illustrative of other useful materials which are also polar are synthetic carbon, silicon, and magnesium silicate (e.g., asbestos).

The adhesive compositions may be applied to the backing by any one of a variety of conventional coating techniques such as roll coating, spray coating, curtain coating, etc. They also may be applied to the backing without modification by extrusion coating, coextrusion, hot melt coating, etc., by employing suitable conventional coating devices known for such coating methods. While primers may be employed to pretreat the backing, they are unnecessary in many applications. Dry coating weight (the weight of dry adhesive applied per unit surface area) can vary substantially depending upon the porosity and irregularity of the backing and of the substrate surface to which the backing is to be adhered, and other factors. For instance, higher polymer loadings are preferred for adhering porous, irregular ceramic tiles to porous surfaces, while lower adhesive loadings are usually required to manufacture tapes, films, and other articles from relatively non-porous, smooth-surfaced materials such as synthetic polymer films and sheets. When the adhesive is applied to non-porous polymeric or metallic substrates intended for adhesion to non-porous polymeric or metallic surfaces, adhesive loadings of about 5 to about 50 pounds of dry adhesive per 3,000 square feet of treated surface are generally adequate. Adequate adhesion in tapes manufactured from continuous sheet polymeric substrates can usually be achieved with dry coating adhesive weights of about 10 to about 20 pounds per 3,000 square feet of treated surface, while coating weights of 20 to about 40 pounds per 3,000 square feet are usually employed for paper-backed tapes such as masking tapes.

The invention is further described by the following examples, wherein Examples 2, 4, 5, 7, 9, 11, 12, 14 and 16 are illustrative of specific modes of practicing the invention. In comparison with Examples 13, 14 and 15, Example 16 illustrates the further improvement in cohesive strength obtainable under acidic conditions by using a polyacid component in combination with the functional monomer described herein. The examples are not intended as limiting the scope of the invention as defined by the appended claims.

TEST STANDARDS

Unless otherwise indicated, the physical properties (shear strength, peel adhesion, etc.) in the examples which follow are for test strips composed of a backing, one mil in thickness, of Mylar (trademark for a polyethylene terephthalate resin) and a substantially dry coating thereon, one mil in thickness, prepared by applying a sufficient thickness of the corresponding latex or polymeric dispersion to the backing and drying the coating to substantial dryness at approximately 150° F. and aged for 24 hours at 73° F. and 50 percent relative humidity. The test temperature is 73° F.

Shear strength is determined in accordance with ASTM D3654-78, PSTC-7 and is a measure of the cohesiveness (internal strength) of an adhesive. ("PSTC" designates the Pressure Sensitive Tape Council). It is based on the time required for a static loaded tape sample to separate from a standard flat surface in a direction essentially parallel to the surface to which it has been affixed with a standard pressure. Each test is conducted on an adhesive coated strip applied to a standard stainless steel panel in a manner such that a one-half inch by one-half inch portion of the strip is in firm contact with the panel with one end portion of the strip being free. The steel panel, with coated strip attached, is held in a rack such that the panel forms an angle of 178° to 180° with the extended tape free end which is then tensioned by application of a force of 500 grams applied as a hanging weight from the free end of the test strip. The elapsed time required for each test strip to separate from the test panel is recorded as shear strength.

Peel adhesion is determined in accordance with ASTM D-3330-78, PSTC-1 and is a measure of the force required to remove a coated, flexible sheet material from a test panel at a specific angle and rate of removal. Unless otherwise specified, the values for peel adhesion reported herein are force values expressed as pounds per inch width of coated test sheet material determined by the following procedure. A one-inch width of the coated sheet is applied to a horizontal surface of a clean, stainless steel test plate with at least five lineal inches of the coated sheet material in firm contact with the steel plate. A hard rubber roller is used to firmly apply the strip and remove all discontinuities and entrapped air. The free end of the coated strip is then doubled back nearly touching itself so that the angle of removal of the strip from the steel plate will be 180°. The free end of the test strip (the one pulled) is attached to the adhesion tester scale (an Instron tensile tester or Harvey tensile tester). The test plate is then clamped in the jaws of the tensile testing machine capable of moving the plate away from the scale at a constant rate of 12 inches per minute. The scale reading in pounds is recorded as the tape is peeled from the steel surface.

Loop tack is a measure of the force required to remove a standard adhesive coated Mylar film loop from a standard (PSTC) stainless steel plate after only nominal contact of the test strip with the steel plate in the absence of significant pressure. A one-half by four-inch strip of one mil Mylar film coated with the sample adhesive is formed into a loop with the adhesive side out, and the loop is applied to a stainless steel plate until the tape loop contacts 0.5 square inch of surface area on the plate. The loop is retracted from the plate at a rate of 12 inches per minute, and loop tack is defined as the force observed when the final portion of the adhesive strip separates from the test plate. Specifically, the steel test plate is inserted in the lower jaws of an Instron tensile tester while the upper portion of the loop is clamped in the upper jaw of the tester and is moved downward toward the test plate at a rate of 12 inches per minute. When the test loop has contacted 0.5 square inch of test plate area, the direction of travel of the upper jaw of the Instron tester is reversed and set to remove the loop from the plate at a rate of 12 lineal inches per minute.

"Twenty degree hold strength to corrugated board" is a measure of combined peel and shear strength of the adhesive mounted on 1-mil Mylar film when applied under standard force to a corrugated cardboard substrate. Samples of adhesive coated Mylar are applied to a standard corrugated cardboard substrate such that a one and one-half inch length of the adhesive coated film adheres to the corrugated surface of the test substrate with the one and one-half inch edge of the sample tape aligned parallel to the corrugated flutes (ridges) of the substrate. After application of the film to the substrate in this manner, the film portion contacting the substrate is rolled down with a standard four and one-half pound rubber-covered roller one time parallel to the one and one-half inch edge of the test tape at a roller speed of 12 inches per minute. The sample is then mounted in a shear test block set at an angle of 20° to the vertical so that the "tail" of the adhesive test strip (the portion of the test tape not adhered to the corrugated substrate) is hanging down from the bottom portion of the corrugated board at an angle of 160° to the plane of the corrugated board. A 500 gram weight is then affixed by appropriate clamps to the "tail end" of the adhesive test strip so that the weight is hanging at an angle of 160° from the portion of the test strip bonded to the corrugated board. A timer is started immediately upon application of the 500 gram weight to the test strip, and hold value is reported as the number of minutes required for the weight to tear the test strip from the corrugated backing.

EXAMPLE 1

A water-based emulsion of an acrylate polymer containing 98.5 weight percent butyl acrylate and 1.5 weight percent methacrylic acid can be prepared by free radical polymerization of the premixed monomers in the presence of water, surfactants and catalysts in an agitated reactor. The monomer premixture is formed by blending 862 grams butyl acrylate, 13 grams methacrylic acid, and 0.1 gram of chain transfer agent. The catalyst premixture can be formed by dissolving 4.0 grams of sodium persulfate in 114 grams deionized water. The reactor is then charged with 690 grams deionized water, 20 grams of an alkylphenoxy poly(ethyleneoxy) ethanol surfactant, 2.5 grams of a sodium alkyl sulfonate surfactant, and 60 grams of the monomer premixture. This reactor charge is then heated to 90° C., 10 ml. of catalyst solution is added, and the resulting mixture is agitated for 10 minutes. Monomer premixture and catalyst solution additions are then commenced. Eight hundred ninety ml. of the monomer premixture is added over a period of 2 hours, and the total catalyst solution is added over a period of 2.5 hours. Thus, catalyst addition is continued for one-half hour after monomer addition is discontinued. After catalyst addition is discontinued, the reaction phase is maintained at 90° C. for an additional 1 hour, is then cooled to 35° C. and removed from the reactor. The pH can be adjusted to 7.5 to 8.0 with ammonium hydroxide.

EXAMPLE 2

The operation described in Example 1 can be repeated employing identical reactor feed materials and operating procedures with the exception that the monomer premixture contains 887 grams butylacrylate, 13.7 grams methacrylic acid, and 18.4 grams of acetoacetoxyethyl methacrylate (AAEMA), corresponding to a finished polymer composition of 96.5 weight percent butylacrylate, 1.5 weight percent methacrylic acid, and 2.0 weight percent AAEMA.

The polymers of Examples 1 and 2 will exhibit ambient and low temperature peel, tack, and shear values characteristic of low temperature pressure sensitive adhesives. However, the polymer of Example 2, containing 2 weight percent acetoacetoxyethyl methacrylate, will possess a substantially higher shear value as an adhesive than the polymer of Example 1 and room temperature tack comparable to that of the polymer of Example 1. The adhesive of Example 2 will evidence much less tendency to be gummy and therefore unmanageable, to creep, or to bleed-through adhesive backings or substrates at ambient temperatures than will the polymer of Example 1.

EXAMPLE 3

To a 2-liter reactor equipped with heating mantle, mechanical stirrer, reflux condenser, nitrogen sparge and three laboratory metering pumps are added 140 grams of distilled water, and the water is sparged with nitrogen and heated to 75° C. The nitrogen sparge is then removed and a nitrogen atmosphere is maintained over the liquid phase.

A monomer pre-emulsion is formed by blending 426 grams of 2-ethylhexyl acrylate, 162 grams methyl acrylate, 12 grams of acrylic acid, 9 grams of nonylphenoxy poly(ethyleneoxy)ethanol nonionic water-soluble surfactant, and 21 grams of octylphenoxy poly(ethyleneoxy)ethanol nonionic surfactant in 140 grams of distilled water. Five percent of this pre-emulsion is introduced to the reactor with agitation. After stirring for 3 minutes, 0.5 gram of sodium persulphate dissolved in 10 grams of distilled water is added. After a further 3 minutes, 0.5 gram of sodium metabisulfite is added, and the mixture is held at 75° C., for 20 minutes. The remainder of the monomer pre-emulsion is then added gradually over a period of 3 hours through one of the metering pumps provided. The catalyst solutions are added through the two remaining metering pumps and concurrently with monomer emulsion addition. One catalyst solution contains 1.5 grams of sodium persulphate dissolved in 75 grams of distilled water, and the other contains 1.5 grams of sodium metabisulphite dissolved in 75 grams of distilled water. These catalyst solutions are added gradually at a rate such that they are metered into the reactor over a period of 3.5 hours. Monomer addition is discontinued ½ hour before catalyst addition is discontinued. Polymerization temperature is maintained at 75° C. throughout the run. After all of the sodium persulphate and sodium metabisulphite solutions have been added, the reaction mixture is held for an additional 30 minutes at 75° C. and is then cooled to room temperature. The resulting latex is neutralized to a pH between 4 and 6.5 with either 7 percent ammonia or 10 percent sodium hydroxide in distilled water. The resulting latex is tested by the procedures described above and is found to have a peel value of 6 pounds and evidences cohesive failure, a loop tack of 1.3 pounds, and a shear value of 100 minutes. Cohesive failure is evidenced by tearing or separation of the adhesive itself, with the separated portions of the adhesive remaining adhered to their respective substrates. These results are summarized in Table 2 which follows Example 5.

EXAMPLE 4

The operation described in Example 3 is repeated with the exception that the monomer pre-emulsion contains 426 grams 2-ethylhexyl acrylate, 156 grams methyl acrylate, 12 grams acrylic acid, and 6 grams of acetoacetoxyethyl methacrylate (AAEMA). Surfactant compositions and operating procedures are as defined in Example 3.

The resulting latex is tested by the procedures described above and has a peel value 3.2 pounds per inch width (evidencing adhesive failure), a loop tack of 1.2 pounds per ½ inch width, and a shear value of 186 minutes. Although this adhesive has a peel strength lower than that obtained in Example 3, its loop tack is essentially equivalent, and its shear strength is substantially higher. These results are summarized in Table 2.

EXAMPLE 5

The operation described in Example 3 is again repeated with the exception that the monomer pre-emulsion contains 426 grams of 2-ethylhexyl acrylate, 150 grams methyl acrylate, 12 grams acrylic acid, and 12 grams AAEMA. Surfactant composition and concentration and operating conditions are otherwise as defined in Example 3.

This product is tested by the procedures described above and has a peel value of 2.6 pounds per inch width (evidencing adhesive failure), a loop tack of 1.1 pounds per ½ inch width and a shear value of 1,866 minutes. These results demonstrate an 18-fold increase in shear value over the adhesive of Example 3 with little or no loss in loop tack.

TABLE 2

| Ex. | MONOMERS, % | | | | RESULTS | | |
|---|---|---|---|---|---|---|---|
| No. | 2-EHA | MA | AA | AAEMA | PEEL | TACK | SHEAR |
| 3 | 71 | 27 | 2 | 0 | 6 | 1.3 | 100 |

TABLE 2-continued

| Ex. No. | MONOMERS, % | | | | RESULTS | | |
|---|---|---|---|---|---|---|---|
| | 2-EHA | MA | AA | AAEMA | PEEL | TACK | SHEAR |
| 4 | 71 | 26 | 2 | 1 | 3.2 | 1.2 | 186 |
| 5 | 71 | 25 | 2 | 2 | 2.6 | 1.1 | 1,866 |

EXAMPLE 6

A latex can be prepared by the procedures described in Example 3 employing a monomer pre-emulsion containing 582 grams (97 weight percent) butyl acrylate, 18 grams (3 weight percent) acrylic acid, 0.1 weight percent of a sodium salt of sulphated nonylphenoxy poly(ethyleneoxy)ethanol surfactant, and 1.5 weight percent of the octyl phenoxy surfactant described in Example 3.

EXAMPLE 7

The operation described in Example 6 can be repeated with the exception that the monomer composition in the pre-emulsion contains 576 grams (96 weight percent) butyl acrylate, 18 grams (3 weight percent) acrylic acid, and 6 grams (1 weight percent) AAEMA with all other compositions and operating conditions remaining the same. The resulting adhesive will have significantly higher shear strength than will the adhesive of Example 6 with little or no loss of tack.

EXAMPLE 8

The operation of Example 6 can be repeated employing a monomer pre-emulsion containing 582 grams 2-ethylhexyl acrylate and 18 grams acrylic acid corresponding to a polymer composition of 97 weight percent 2-ethyl hexylacrylate and 3 weight percent acrylic acid, with surfactant compositions and operating conditions otherwise remaining the same.

EXAMPLE 9

The operation described in Example 6 can be repeated with the exception that the monomer content of the monomer pre-emulsion corresponds to 576 grams 2-ethylhexyl acrylate, 18 grams acrylic acid and 6 grams AAEMA, resulting in a polymer containing 96 weight percent 2-ethylhexyl acrylate, 3 weight percent acrylic acid, and 1 weight percent AAEMA. This polymer will have significantly higher shear than the polymer obtained in Example 8 with little or no loss in tack.

EXAMPLE 10

The operation described in Example 6 can be repeated with a monomer pre-emulsion having a monomer content of 291 grams butyl acrylate, 291 grams 2-ethylhexyl acrylate, and 18 grams acrylic acid, corresponding to a polymer composition of 48.5 weight percent butylacrylate, 48.5 weight percent 2-ethylhexyl acrylate, and 3 weight percent acrylic acid.

EXAMPLE 11

The operation described in Example 6 can be repeated employing otherwise identical compositions and conditions with the exception that the monomer pre-emulsion contains 288 grams butyl acrylate, 288 grams 2-ethylhexyl acrylate, 18 grams acrylic acid, and 6 grams AAEMA, corresponding to a polymer composition of 48 weight percent butyl acrylate, 48 weight percent 2-ethylhexyl acrylate, 3 weight percent acrylic acid, and 1 weight percent AAEMA. The resulting polymer will have significantly higher shear than the polymer of Example 10 with little or no loss of tack.

EXAMPLE 12

An N-methylolacrylamide-containing polymer can be obtained by the procedure described in Example 6 with the exception that the monomer pre-emulsion contains 288 grams butyl acrylate, 288 grams 2-ethylhexyl acrylate, 18 grams acrylic acid and 6 grams N-methylolacrylamide with all other operating conditions and surfactant compositions being the same as described in Example 6. The resulting polymer will contain 48 weight percent butyl acrylate, 48 weight percent 2-ethylhexyl acrylate, 3 weight percent acrylic acid, and 1 weight percent N-methylolacrylamide. This polymer will have significantly higher cohesive (shear) strength than the polymer described in Example 10 and peel and tack values substantially lower than the peel and tack values of the polymer obtained in Example 11.

EXAMPLE 13

To a 2-liter reactor equipped with heating mantle, mechanical stirrer, reflux condenser, nitrogen sparge and three laboratory metering pumps are added 140 grams of distilled water, and the water is sparged with nitrogen and heated to 75° C. The nitrogen sparge is then removed and a nitrogen atmosphere is maintained over the liquid phase.

A monomer pre-emulsion is formed by blending 402 grams of butyl acrylate (BA), 111 grams of methyl acrylate (MA), 60 grams of 2-ethylhexyl acrylate (EHA), 18 grams of acrylic acid (AA), 3 grams of methacrylic acid (MAA), 9 grams of nonylphenoxy poly(ethyleneoxy)ethanol nonionic water-soluble surfactant, and 21 grams of octylphenoxy poly(ethyleneoxy)ethanol nonionic surfactant in 140 grams of distilled water. This pre-emulsion corresponds to a finished polymer composition of, by weight, 67 percent BA, 18.5 percent MA, 10 percent EHA, 3 percent AA, and 1.5 percent MAA. Five percent of this pre-emulsion is introduced to the reactor with agitation. After stirring for 3 minutes, 0.5 gram of sodium persulphate dissolved in 10 grams of distilled water is added. After a further 3 minutes, 0.5 gram of sodium metabisulfite is added, and the mixture is held at 75° C. for 20 minutes. The remainder of the monomer pre-emulsion is then added gradually over a period of 3 hours through one of the metering pumps provided. The catalyst solutions are added through the two remaining metering pumps and concurrently with monomer emulsion addition. One catalyst solution contains 1.5 grams of sodium persulphate dissolved in 75 grams of distilled water, and the other contains 1.5 grams of sodium metabisulphite dissolved in 75 grams of distilled water. These catalyst solutions are added gradually at a rate such that they are metered into the reactor over a period of 3.5 hours. Monomer addition is discontinued ½ hour before catalyst addition is discontinued, and polymerization temperature is maintained at 75° C. throughout the run. After all of the sodium persulphate and sodium metabisulphite solutions have been added, the reaction mixture is held for an additional 30 minutes at 75° C. and is then cooled to room temperature. Two separate portions of the resulting latex are adjusted to pH values of about 4 and about 5.6 with either 7 percent ammonia or 10 percent sodium hydroxide in distilled water. The resulting latex portions are tested by the procedures described above and found to have a shear value of 1,000 minutes at pH 4.0 and a shear value of 1,300 minutes at pH 5.6. Cohesive failure is exhibited by the latex in the shear test. Cohesive failure is evidenced by tearing or separation of the adhesive itself, with the separated portions of the adhesive remaining adhered to their respective substrates. These results are summarized in Table 3 below.

EXAMPLE 14

The operation described in Example 13 is repeated except that 1.5 grams acetoacetoxyethyl methacrylate is substituted for 1.5 grams of the methyl acrylate, whereby the monomer pre-emulsion contains, by weight, 402 grams (67%) butyl acrylate, 109.5 grams (18.25%) methyl acrylate (MA), 60 grams (10%) 2-ethylhexyl acrylate (EHA), 18 grams (3%) acrylic acid (AA), 9 grams (1.5%) methacrylic acid (MAA), and 1.5 grams (0.25%) acetoacetoxyethyl methacrylate (AAEMA). Surfactant compositions and operating procedures are as defined in Example 13. Three separate portions of the resulting latex are adjusted to pH values of about 4, about 5.6 and about 6.2.

The resulting latex portions are tested by the procedures described above and found to have a shear value of 1,400 minutes at about pH 4.0, a shear value of 5,700 minutes at about pH 5.6, and a shear value of more than 25,000 minutes at about pH 6.2. These results are summarized in Table 2. At both pH 4 and pH 5.6, the tack of the adhesive of this example is not significantly different from the tack of the adhesive of Example 13 at the same pH value.

EXAMPLE 15

The tetrasodium salt of ethylenediaminetetraacetic acid (Na$_4$EDTA) is added to a third portion of the latex prepared in Example 13 in an amount corresponding to 0.8 phm (i.e. 0.8 part of Na$_4$EDTA per 100 parts of monomers in the latex portion). Two portions of the resulting Na$_4$EDTA-modified latex are adjusted to pH values of about 4 and about 5.6 with either 7 percent ammonia or 10 percent sodium hydroxide in distilled water. The resulting pH-adjusted latex portions are tested by the procedure described above and found to have a shear value of 1,400 minutes at about pH 4.0 and a shear value of 1,300 minutes at about pH 5.6. These results are shown in Table 3 below.

EXAMPLE 16

The tetrasodium salt of ethylenediaminetetraacetic acid (Na$_4$EDTA) is added to a fourth portion of the AAEMA-containing latex prepared in Example 14 in an amount corresponding to 0.8 phm (i.e. 0.8 part of Na$_4$EDTA per 100 parts of monomers in the latex portion). Three portions of the resulting Na$_4$EDTA-modified AAEMA-containing latex are adjusted to pH values of about 4, about 5.6 and about 6.2 with either 7 percent ammonia or 10 percent sodium hydroxide in distilled water. The resulting pH-adjusted latex portions are tested by the procedure described above and found to have a shear value of 9,000 minutes at about pH 4.0, a shear value of 17,000 minutes at about pH 5.6, and a shear value of more than 25,000 minutes at about pH 6.2. These results are shown in Table 3.

The results (see Table 3) show (a) increased shear for Na$_4$EDTA-containing latex relative to otherwise identical latex wherein the latex does not contain AAEMA at about pH 4.0 (Examples 13 and 15); (b) increased shear for Na$_4$EDTA-containing latex relative to otherwise identical latex wherein the latex does contain AAEMA at about pH 4.0 and about pH 5.6 (Examples 14 and 16); and (c) a synergistic effect on shear from a combination of Na$_4$EDTA and AAEMA (Example 16 in view of Examples 13, 14 and 15).

TABLE 3

| Ex. No. | MONOMERS, % | | | | | | Na$_4$EDTA | SHEAR$^a$ | | |
| --- | --- | --- | --- | --- | --- | --- | --- | --- | --- | --- |
| | BA | MA | EHA | AA | MAA | AAEMA | phm$^b$ | pH 4.0 | pH 5.6 | pH 6.2 |
| 13 | 67 | 18.50 | 10 | 3 | 1.5 | 0 | 0 | 1,000 | 1,300 | — |
| 14 | 67 | 18.25 | 10 | 3 | 1.5 | 0.25 | 0 | 1,400 | 5,700 | >25,000$^c$ |
| 15 | 67 | 18.50 | 10 | 3 | 1.5 | 0 | 0.8 | 1,400 | 1,300 | — |
| 16 | 67 | 18.25 | 10 | 3 | 1.5 | 0.25 | 0.8 | 9,000 | 17,000 | >25,000$^c$ |

$^a$s.s., ¼ in. × ¼ in., 500 g., 1.0 mil adhesive, 1.0 mil Mylar backing
$^b$Parts per hundred parts of monomers
$^c$Test discontinued at 25,000 minutes Inasmuch as the monomers are essentially completely polymerized in the polymerization processes employed in the foregoing Examples, amounts of polyacid component (e.g., the tetrasodium salt of EDTA) expressed as "phm" or parts per 100 parts of monomer in the charge are essentially equal in numerical value to weight percent based on the weight of the resulting polymer.

The pH of any given non-aqueous composition of this invention (e.g., an adhesive solution or hot melt) means the pH measured for a mixture of 50 weight percent water and 50 weight percent of the given composition.

While particular embodiments of the invention have been described, it will be understood, of course, that the invention is not limited to these embodiments, since many obvious modifications can be made, and it is intended to include within this invention any such modifications as will fall within the scope of the appended claims.

What is claimed is:

1. A mixture comprising (I) a polyacid component selected from the group consisting of (a) aminopolyphosphonic acids, (b) hydroxypolyphosphonic acids, (c) aminopolycarboxylic acids, (d) mixtures of (a), (b), and (c), and (e) salts of (a), (b), (c), and (d), and (II) two or more monomers which are polymerizable to produce a copolymer containing at least one pendant functional group of formula B:

in which R$_1$ is a divalent organic radical of at least 3 atoms in length and X is —CO—R$_4$ or —CN wherein R$_4$ is hydrogen or a monovalent organic radical, wherein the mixture, upon polymerization, forms a pressure sensitive adhesive composition and the polyacid is free of carbon-to-carbon unsaturation.

2. The mixture of claim 1 wherein the polyacid component is present in an amount effective for increasing cohesive strength under acidic conditions.

3. The mixture of claim 1 comprising at least about 0.1 weight percent polyacid based on the weight of the polymer.

4. The mixture of claim 1 comprising about 0.1 to about 20 weight percent polyacid based on the weight of the polymer.

5. The mixture of claim 1 comprising about 0.5 to about 10 weight percent polyacid based on the weight of the polymer.

6. The mixture of claim 1 comprising about 0.5 to about 5 weight percent polyacid based on the weight of the polymer.

7. The mixture of claim 1 wherein the polyacid is an aminopolycarboxylic acid.

8. The mixture of claim 1 wherein the polyacid is an aminopolycarboxylic acid selected from the group consisting of ethylenediaminetetraacetic acid, N-hydroxyethylethylenediaminetriacetic acid, nitrilotriacetic acid, iminodiacetic acid, methyliminodiacetic acid, diethylenetriaminepentaacetic acid, and 1,2-diaminocyclohexanetetraacetic acid or salt thereof or (b) at least one aminopolyphosphonic acid or salt thereof.

9. The mixture of claim 1 wherein the polyacid is selected from the group consisting of ethylenediaminetetraacetic acid and the tetrasodium salt thereof.

10. The mixture of claim 1 wherein the polyacid is an aminopolycarboxylic acid or salt thereof and is present in an amount of about 0.5 to about 5 weight percent based on the weight of the polymer.

11. The mixture of claim 1 wherein the pressure sensitive adhesive composition has a pH less than about 6.5.

12. The mixture of claim 1 wherein the pressure sensitive adhesive composition has a pH less than about 6.

13. The mixture of claim 1 wherein the polyacid is an aminopolycarboxylic acid or salt thereof and is present in an amount effective for increasing cohesive strength of the pressure sensitive adhesive composition at a pH of about 6.5 or less.

14. The mixture of claim 1 wherein the pressure sensitive adhesive composition has a pH of about 6 or less, the polyacid is the tetrasodium salt of ethylenediaminetetraacetic acid and is present in the mixture in an amount from about 0.5 to about 5 weight percent based on the weight of the polymer.

15. The mixture of claim 1 further comprising at least one olefinically unsaturated carboxylic acid ester monomer, the olefinically unsaturated carboxylic acid ester monomers being present in a concentration sufficient to constitute at least about 40 weight percent of the polymer.

16. The mixture of claim 1 further comprising at least one monoolefin monomer having up to about 4 carbon atoms and at least one alkenyl or alkenol ester of a saturated carboxylic acid monomer, the monoolefin monomers being present in a concentration sufficient to constitute at least about 1 weight percent of the polymer and the alkenyl and alkenol ester of saturated carboxylic acid monomers being present in a concentration sufficient to constitute at least about 40 weight percent of the polymer.

17. The mixture of claim 1 wherein at least one of the monomers has the formula A:

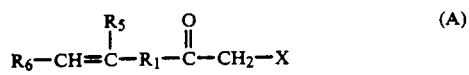

in which $R_5$ and $R_6$ are independently selected from the group consisting of hydrogen, hydroxy, halo, amino and monovalent organic radicals.

18. The mixture of claim 1 wherein X is $-CO-R_4$.

19. The mixture of claim 1 wherein $R_1$ is a divalent organic radical of about 3 to about 40 carbon atoms in length, and $R_4$ is hydrogen or an alkyl group having 1 to about 8 carbon atoms.

20. The mixture of claim 1 comprising at least about 0.1 weight percent polyacid based on the weight of the polymer, further comprising at least one olefinically unsaturated carboxylic acid ester monomer, the olefinically unsaturated carboxylic acid ester monomers being present in a concentration sufficient to constitute at least about 40 weight percent of the polymer, and wherein the pressure sensitive adhesive composition has a pH less than about 6.

21. The mixture of claim 1 comprising about 0.1 to about 20 weight percent polyacid based on the weight of the polymer, further comprising at least one olefinically unsaturated carboxylic acid ester monomer, the olefinically unsaturated carboxylic acid ester monomers being present in a concentration sufficient to constitute at least about 60 weight percent of the polymer, and wherein the pressure sensitive adhesive composition has a pH less than about 6.5.

22. The mixture of claim 21 wherein the olefinically unsaturated carboxylic acid ester monomer is selected from the group consisting of esters of acrylic acid and methacrylic acid having 4 to about 17 carbon atoms, the polymer has a $T_g$ of about $-10°$ C. or less and comprises at least about 0.1 weight percent of a functional monomer the formula A:

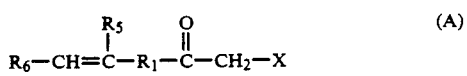

in which $R_5$ and $R_6$ are independently selected from the group consisting of hydrogen, hydroxy, halo, amino and monovalent organic radicals, and the pressure sensitive adhesive composition is normally tacky when cured.

23. The mixture of claim 22 wherein the functional monomer is selected from the group consisting of acetoacetoxyethyl methacrylate, acetoacetoxyethyl acrylate and combinations thereof, the functional monomer being present in an amount from about 0.1 to about 10 weight percent based on the weight of the polymer, and the polyacid is the tetrasodium salt of ethylenediaminetetraacetic acid and is present in a concentration of about 0.5 to about 5 weight percent based on the weight of the polymer.

* * * * *

UNITED STATES PATENT AND TRADEMARK OFFICE
CERTIFICATE OF CORRECTION

PATENT NO. : 5,053,452

DATED : October 1, 1991

INVENTOR(S) : Lon T. Spada and Joseph J. Wilczynski

It is certified that error appears in the above-identified patent and that said Letters Patent is hereby corrected as shown below:

On the title page, item (63), insert --, now U.S. Patent 4,908,403-- after "April 7, 1988".

Column 6, line 17, replace "polythiolkylene" with -- polythioalkylene --.

Column 6, line 34, replace "$HO(CH_2[R_8(-O)_nH$" with -- $HO(CH_2 - CH[R_8] - O)_nH$ --.

Signed and Sealed this

Thirtieth Day of August, 1994

Attest:

BRUCE LEHMAN

Attesting Officer

Commissioner of Patents and Trademarks